United States Patent
Saito et al.

(10) Patent No.: US 10,173,166 B2
(45) Date of Patent: Jan. 8, 2019

(54) CARBON DIOXIDE RECOVERING APPARATUS AND METHOD FOR OPERATING THE SAME

(71) Applicant: KABUSHIKI KAISHA TOSHIBA, Tokyo (JP)

(72) Inventors: Satoshi Saito, Kanagawa (JP); Hideo Kitamura, Tokyo (JP); Mitsuru Udatsu, Kanagawa (JP); Toshihisa Kiyokuni, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 136 days.

(21) Appl. No.: 15/184,727

(22) Filed: Jun. 16, 2016

(65) Prior Publication Data
US 2016/0296880 A1    Oct. 13, 2016

Related U.S. Application Data

(62) Division of application No. 13/927,848, filed on Jun. 26, 2013.

(30) Foreign Application Priority Data

Jun. 25, 2012 (JP) .................................. 2012-141781

(51) Int. Cl.
*B01D 53/14* (2006.01)
*B01D 53/62* (2006.01)

(52) U.S. Cl.
CPC ..... *B01D 53/1425* (2013.01); *B01D 53/1412* (2013.01); *B01D 53/1475* (2013.01);
(Continued)

(58) Field of Classification Search
None
See application file for complete search history.

(56) References Cited

U.S. PATENT DOCUMENTS

| 3,563,696 A | 2/1971 | Benson |
| 4,152,217 A | 5/1979 | Eisenberg et al. |

(Continued)

FOREIGN PATENT DOCUMENTS

| EP | 2269712 A1 | 1/2011 |
| EP | 2455154 A1 | 5/2012 |

(Continued)

OTHER PUBLICATIONS

Colin F. Alie, CO2 Capture With MEA: Integrating the Absorption Process and Steam Cycle of an Existing Coal-Fired Power Plant, A thesis presented to the University of Waterloo in fulfillment of the thesis requirement for the degree of Master of Applied Science in Chemical Engineering, 2004, pp. 44-45, Waterloo, Ontario, Canada.

(Continued)

*Primary Examiner* — Anita Nassiri-Motlagh
(74) *Attorney, Agent, or Firm* — Patterson & Sheridan, LLP

(57) ABSTRACT

A method of operating a carbon dioxide recovering apparatus includes introducing flue gas into an absorbing tower, bringing the flue gas into contact with an absorbing solution, and discharging a first rich solution, which is then divided into second and third rich solutions. The second rich solution is heated using a lean solution from a releasing tower. The third rich solution is heated using steam from the releasing tower. The lean solution and the steam are generated in the releasing tower from the second and third rich solutions. The steam used to heat the third rich solution is separated, in a gas-liquid separator, into carbon dioxide and condensate water. The amount of condensate water formed in the gas-liquid separator is measured, and a flow dividing ratio between the second rich solution and the third rich solution is controlled based on a change in the amount of the condensate water.

10 Claims, 4 Drawing Sheets

(52) U.S. Cl.
CPC ........ *B01D 53/62* (2013.01); *B01D 2252/204* (2013.01); *B01D 2252/20478* (2013.01); *B01D 2258/0283* (2013.01); *B01D 2259/65* (2013.01); *Y02C 10/04* (2013.01); *Y02C 10/06* (2013.01)

(56) References Cited

U.S. PATENT DOCUMENTS

| | | |
|---|---|---|
| 8,080,089 B1 | 12/2011 | Wen et al. |
| 2012/0160453 A1 | 6/2012 | Alzner et al. |

FOREIGN PATENT DOCUMENTS

| | | |
|---|---|---|
| JP | 2009214089 A | 9/2009 |
| JP | 2010527774 A | 8/2010 |
| JP | 2011000525 A | 1/2011 |
| JP | 2011517615 A | 6/2011 |
| WO | 2010086039 A1 | 8/2010 |

OTHER PUBLICATIONS

Extended European Search Report dated Aug. 29, 2014, mailed in European counterpart Application No. 13173088.9, 6 pages (with translation).

Australian Office Action dated Dec. 18, 2014, filed in Australian counterpart Application No. 2013206469, 2 pages.

Chinese Office Action dated Jan. 23, 2015, filed in Chinese counterpart Application No. 201310353506.6, 19 pages (with translation).

CARBON DIOXIDE RECOVERING APPARATUS AND METHOD FOR OPERATING THE SAME

CROSS-REFERENCE TO RELATED APPLICATION

This application is a division of U.S. patent application Ser. No. 13/927,848, filed on Jun. 26, 2013, which is based upon and claims the benefit of priority from Japanese Patent Application No. 2012-141781, filed Jun. 25, 2012, the entire contents of each of which are incorporated herein by reference.

FIELD

Embodiments described herein relate generally to a carbon dioxide recovering apparatus and a method for operating a carbon dioxide recovering apparatus.

BACKGROUND

Recently, in terms of recovery of carbon dioxide, a carbon dioxide recovery and storage technique attracts attention as an effective measure against a globally-concerning global warming problem. Especially, for exhaust gas from a thermal power plant and the like, a method for recovering carbon dioxide by an alkaline aqueous solution is considered.

As such a carbon dioxide recovering apparatus is known one including an absorbing tower causing carbon dioxide contained in the flue gas to be absorbed in an absorbing solution to generate a rich solution, a releasing tower heating the rich solution discharged from the absorbing tower to release and separate carbon dioxide as well as steam and returning a generated lean solution to the absorbing tower, a first heat exchanger allowing the lean solution supplied from the releasing tower to the absorbing tower to pass therethrough, a second heat exchanger allowing carbon dioxide containing steam separated in the releasing tower to pass therethrough, and a flow distributor dividing and supplying the rich solution discharged from the absorbing tower to the first heat exchanger and the second heat exchanger and adapted to cause the rich solution introduced into the first heat exchanger and the second heat exchanger to heat-exchange with the lean solution and the carbon dioxide containing steam, respectively, and to thereafter be supplied to the releasing tower.

In the aforementioned conventional carbon dioxide recovering apparatus, in a case where a divided flow rate to the second heat exchanger is lower than an optimum value, heat exchange with the carbon dioxide containing steam is not performed sufficiently. On the other hand, in a case where the divided flow rate to the second heat exchanger is higher than the optimum value, heat exchange with the carbon dioxide containing steam is performed sufficiently, but a temperature of the rich solution heated in the releasing tower is lowered, and a releasing performance of carbon dioxide is degraded. This case causes a problem in which the lean solution from which carbon dioxide is not released sufficiently is sent to the absorbing tower, and in which carbon dioxide in the exhaust gas cannot be absorbed sufficiently in the absorbing tower. An increase in energy to be provided to a reboiler to avoid this situation results in an increase in energy required for recovery of carbon dioxide.

DETAILED DESCRIPTION

According to one embodiment, a carbon dioxide recovering apparatus includes a flow distributor dividing the first rich solution discharged from an absorbing tower into a second rich solution and a third rich solution, a reheat exchanger heating the second rich solution with a lean solution discharged from a releasing tower as a heat source, a heating unit heating the third rich solution with a carbon dioxide containing steam to be released from the releasing tower as a heat source, a gas-liquid separator separating the carbon dioxide containing steam used to heat the third rich solution into carbon dioxide and condensate water, a measuring unit measuring an amount of the condensate water in the gas-liquid separator, and a controller. The controller controls a flow dividing ratio in the flow distributor based on a change in the amount of the condensate water measured in the measuring unit.

Embodiments will now be explained with reference to the accompanying drawings.

(First Embodiment)

Figure 1:
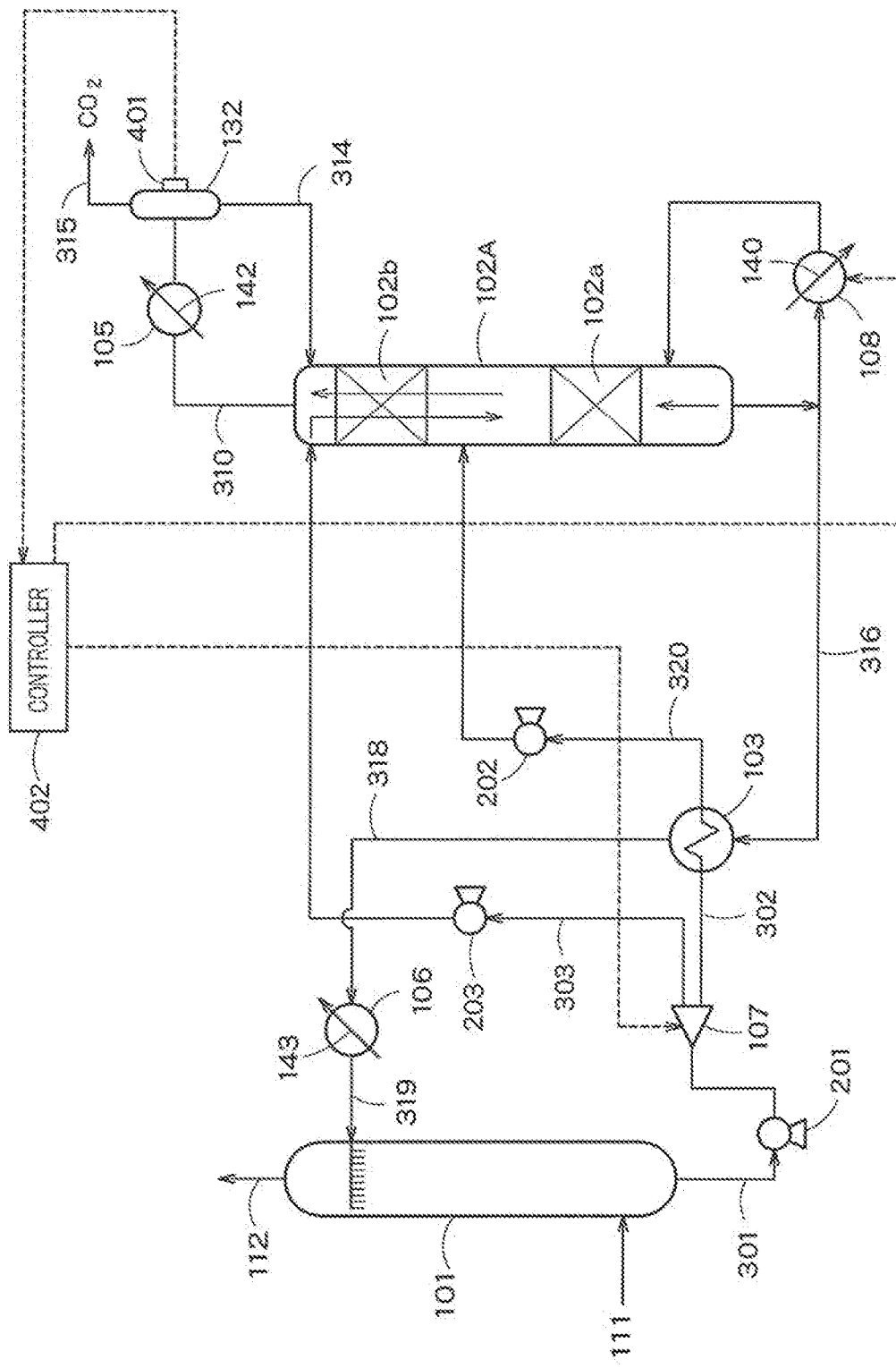
FIG. 1 is a schematic configuration of a carbon dioxide recovering apparatus according to a first embodiment.

FIG. 1 illustrates a schematic configuration of a carbon dioxide recovering apparatus according to a first embodiment. This carbon dioxide recovering apparatus includes an absorbing tower 101, a reheat exchanger 103, a gas-liquid separator 132, coolers 105 and 106, a releasing tower 102A, a reboiler 108, pumps 201, 202, and 203, and a flow distributor 107.

The flue gas containing carbon dioxide 111 introduced into the absorbing tower 101 contacts an absorbing solution that absorbs carbon dioxide, and carbon dioxide is removed. The absorbing solution absorbs carbon dioxide from the flue gas containing carbon dioxide 111 to generate a rich solution 301.

For example, the absorbing tower 101 is a countercurrent gas-liquid contacting unit that brings the flue gas containing carbon dioxide 111 supplied from a lower portion into gas-liquid contact with a lean solution 319 flowing down from an upper portion.

The flue gas containing carbon dioxide 111 to be introduced into the absorbing tower 101 is not particularly limited and is combustion exhaust gas or process exhaust gas, for example. The flue gas containing carbon dioxide 111 may be introduced after a cooling treatment as needed.

Also, the absorbing solution is not particularly limited as long as it is an alkaline solution and can be an amine aqueous solution such as monoethanolamine (MEA) and diethanolamine (DEA), for example. Decarbonated gas 112 from which carbon dioxide has been removed in the absorbing tower 101 is discharged from an upper portion of the absorbing tower 101.

The rich solution 301 discharged from the absorbing tower 101 is given via the pump 201 to the flow distributor 107 and is divided into rich solutions 302 and 303. The rich solution 302 heat-exchanges with an after-mentioned lean solution 316 in the reheat exchanger 103 and is thus heated, and a heated rich solution 320 is supplied via the pump 202 to the releasing tower 102A. Also, the rich solution 303 is provided to a position of the releasing tower 102A located further on an upper side than a position to which the rich solution 320 is provided, specifically to an after-mentioned heat exchange layer 102*b*, as illustrated in FIG. 1.

The releasing tower 102A has a heat exchange layer 102*a* and the heat exchange layer 102*b* provided on an upper stage of the heat exchange layer 102*a*. The rich solution 303 is supplied to the heat exchange layer 102*b* on the upper stage, passes through the heat exchange layer 102*b*, and moves downward. The rich solution 320 is supplied between the heat exchange layer 102*a* and the heat exchange layer 102*b*, passes through the filling layer 102*a* on the lower stage, and moves downward. Carbon dioxide containing steam passes through the filling layers 102*a* and 102*b* upward for heat exchange. The rich solutions 303 and 320 are heated to cause most carbon dioxide as well as steam to be released, separated, and discharged from an upper portion of the releasing tower 102A as carbon dioxide containing steam 310, and a high-temperature lean solution 316 from which most carbon dioxide has been removed is discharged from a lower portion of the releasing tower 102A.

The releasing tower 102A is a countercurrent gas-liquid contacting unit, for example. The reboiler 108 heats a stored solution in the releasing tower 102A with use of high-temperature steam 140 as an externally-supplied heat. By doing so, the carbon dioxide containing steam moves upward in the releasing tower 102A.

The carbon dioxide containing steam 310 discharged from the releasing tower 102A is supplied to the cooler 105, is cooled by a refrigerant 142 such as cold water to be supplied externally, and is discharged to the gas-liquid separator 132.

The carbon dioxide containing steam 310 cooled in the cooler 105 is separated into carbon dioxide 315 and condensate water 314 in the gas-liquid separator 132, and the carbon dioxide 315 is discharged and recovered. The gas-liquid separator 132 is provided with a water gauge 401 for measurement of water level changes of the condensate water 314. In other words, an amount of the condensate water in the gas-liquid separator 132 (an amount of the condensate water to be generated per unit time) is measured. The condensate water 314 can be supplied to the releasing tower 102A.

The lean solution 316 discharged from the releasing tower 102A heat-exchanges with the rich solution 302 in the reheat exchanger 103. A lean solution 318 after heat exchange in the reheat exchanger 103 is supplied to the cooler 106 and is cooled by a refrigerant 143 such as cold water to be supplied externally. A lean solution 319 cooled in the cooler 106 is supplied to the absorbing tower 101, absorbs carbon dioxide from the flue gas containing carbon dioxide 111, and becomes the rich solution 301. In this manner, in the carbon dioxide recovering apparatus, the absorbing solution circulates between the absorbing tower 101 and the releasing tower 102A, and carbon dioxide is recovered.

The carbon dioxide recovering apparatus also includes a controller 402 that obtains a measurement result of the water gauge 401 and controls divided flow rates (flow dividing ratio) of the rich solutions 302 and 303 in the flow distributor 107 and a heat input amount in the reboiler 108.

Figure 2:
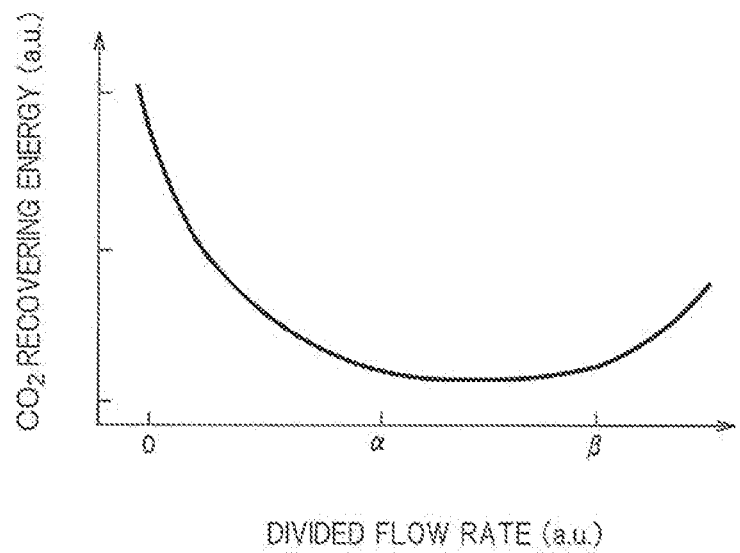
FIG. 2 is a graph illustrating an example of relationship between a divided flow rate of a rich solution and carbon dioxide recovering energy.

An example of relationship between the divided flow rate of the rich solution 303 and carbon dioxide recovering energy in such a carbon dioxide recovering apparatus is illustrated in FIG. 2. As illustrated in FIG. 2, when the divided flow rate of the rich solution 303 is raised from zero gradually, the carbon dioxide recovering energy is lowered gradually. This suggests that heat recovery of the rich solution 303 from the carbon dioxide containing steam at the upper portion of the releasing tower 102A is carried out effectively. When the divided flow rate is between predetermined values α and β, the carbon dioxide recovering energy keeps a low value. When the divided flow rate exceeds the predetermined value β, the carbon dioxide recovering energy is significantly raised along with the raise of the divided flow rate of the rich solution 303. This suggests that, by supplying the rich solution 303 to the releasing tower 102A excessively, a temperature in the releasing tower 102A is lowered, which prevents release of carbon dioxide. Accordingly, it is preferable to set the divided flow rate of the rich solution 303 in a range of α to β.

Figure 3:
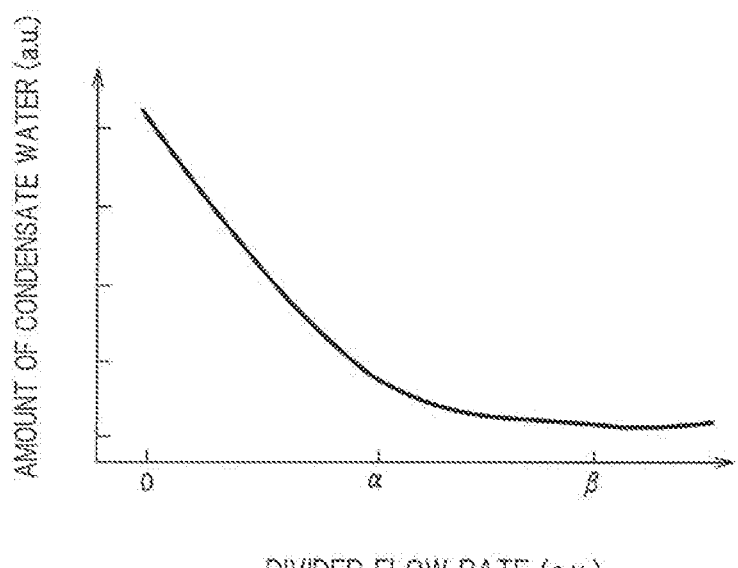
FIG. 3 is a graph illustrating an example of relationship between the divided flow rate of the rich solution and an amount of condensate water per unit time in a gas-liquid separator.

FIG. 3 illustrates an example of relationship between the divided flow rate of the rich solution 303 and the amount of the condensate water per unit time in the gas-liquid separator 132. As illustrated in FIG. 3, when the divided flow rate of the rich solution 303 is raised from zero, the amount of the condensate water per unit time is decreased along with the raise of the divided flow rate. The reason for this is that heat recovery of the rich solution 303 from the carbon dioxide containing steam at the upper portion of the releasing tower 102A is carried out effectively, which causes a decrease in a steam amount to be carried to the gas-liquid separator 132. It is apparent from FIG. 3 that the amount of the condensate water becomes almost constant when the divided flow rate of the rich solution 303 exceeds the predetermined value α.

Accordingly, from FIGS. 2 and 3, a divided flow rate when the amount of the condensate water becomes almost constant, that is, when a water level change of the condensate water 314 in the gas-liquid separator 132 to be measured by the water gauge 401 becomes almost constant, after a gradual raise of the divided flow rate of the rich solution 303 from zero, is an optimum divided flow rate in which the carbon dioxide recovering energy is restricted.

In this manner, by determining the divided flow rate of the rich solution 303 while monitoring the water level change of the condensate water 314 in the gas-liquid separator 132, the divided flow rate of the rich solution 303 can be optimum, heat recovery of the rich solutions 302 and 303 from the lean solution 316 and the carbon dioxide containing steam can be performed effectively, and the carbon dioxide recovering energy can be restricted.

(Second Embodiment)

Figure 4:
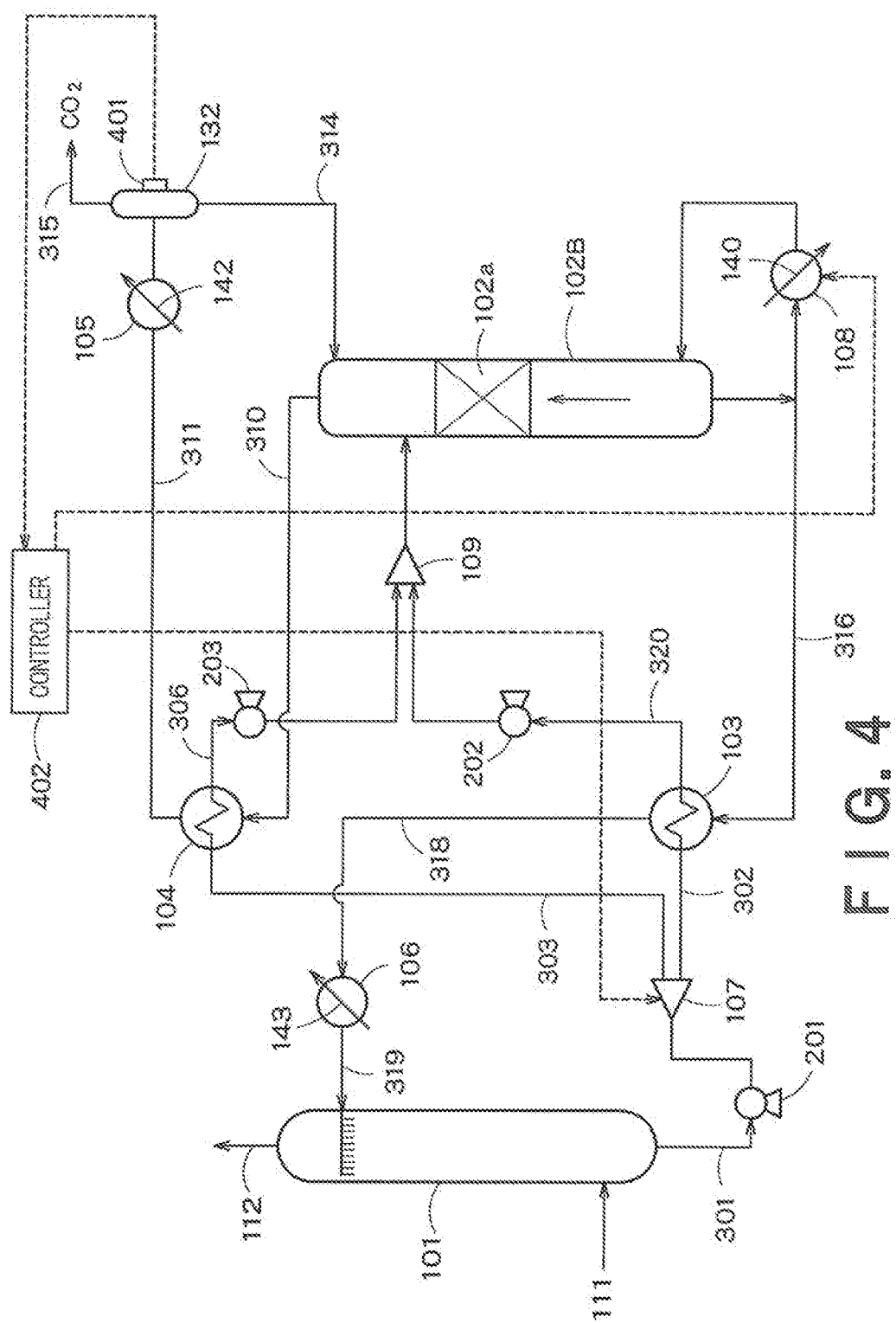
FIG. 4 is a schematic configuration of a carbon dioxide recovering apparatus according to a second embodiment.

FIG. 4 illustrates a schematic configuration of a carbon dioxide recovering apparatus according to a second embodiment. The carbon dioxide recovering apparatus according to the present embodiment differs from the first embodiment illustrated in FIG. 1 in that a carbon dioxide generator 104 and a joining unit 109 are provided, and in that heat exchange between the rich solution 303 and the carbon dioxide containing steam 310 is performed in the carbon dioxide generator 104.

The rich solution 301 discharged from the absorbing tower 101 is divided into the rich solutions 302 and 303 by the flow distributor 107. The rich solution 302 heat-exchanges with the lean solution 316 in the reheat exchanger 103 and is heated. On the other hand, the rich solution 303 heat-exchanges with the carbon dioxide containing steam 310 in the carbon dioxide generator (heat exchanger) 104 and is heated. Carbon dioxide containing steam 311 that has passed through the carbon dioxide generator 104 is supplied to the cooler 105.

The rich solution 320 heated in the reheat exchanger 103 and a rich solution 306 heated in the carbon dioxide generator 104 are joined in the joining unit 109 and are supplied to a releasing tower 102B.

The rich solution supplied to the releasing tower 102B passes through the filling layer 102a and moves downward. Carbon dioxide containing steam passes through the filling layer 102a upward for heat exchange with the rich solution. The rich solution is heated to cause most carbon dioxide as well as steam to be released, separated, and discharged from an upper portion of the releasing tower 102B as the carbon dioxide containing steam 310, and the high-temperature lean solution 316 from which most carbon dioxide has been removed is discharged from a lower portion of the releasing tower 102B.

In the carbon dioxide recovering apparatus configured in this manner as well as in the aforementioned first embodiment, an optimum divided flow rate of the rich solution 303 can be determined easily while a water level change of the condensate water 314 in the gas-liquid separator 132 can be monitored. Accordingly, heat recovery of the rich solutions 302 and 303 from the lean solution 316 and the carbon dioxide containing steam can be performed effectively, and carbon dioxide recovering energy can be restricted.

In the above first and second embodiments, a method of raising the divided flow rate of the rich solution 303 gradually from zero until the amount of the condensate water becomes almost constant has been described. However, an initial value of the divided flow rate of the rich solution 303 may be set to a certain large value, and an optimum divided flow rate may be obtained by decreasing the divided flow rate of the rich solution 303 gradually while confirming that the amount of the condensate water is not increased excessively (that the amount of the condensate water is almost constant). Specifically, the divided flow rate of the rich solution 303 is lowered gradually until the amount of the condensate water does not fall in a certain range any more.

Also, after determination of the optimum divided flow rate of the rich solution 303, to achieve a desired carbon dioxide recovering ratio, the heat input amount in the reboiler 108 may be controlled while confirming that the amount of the condensate water is not increased excessively (that the amount of the condensate water is almost constant).

For measurement of the amount of the condensate water per unit time in the gas-liquid separator 132, a mass meter may be used instead of the water gauge 401, or a flowmeter may be used to measure a flow rate of the condensate water 314 to be returned from the gas-liquid separator 132 to the releasing tower 102A or 102B, and the amount of the condensate water may be derived from the measured flow rate.

EXAMPLES

Example 1

In the carbon dioxide recovering apparatus illustrated in FIG. 1, the flue gas containing carbon dioxide 111 with 12% carbon dioxide with a flow rate of 100 Nm³/h was supplied to the absorbing tower 101 and was brought into countercurrent contact with an amine absorbing solution in the absorbing tower 101 to prepare the rich solution 301. First, the divided flow rate of the rich solution 303 was set to zero, and an entire amount of the rich solution 301 was set as the rich solution 302. At this time, a carbon dioxide recovering ratio at an exit of the absorbing tower 101 was 80%. When the heat input amount in the reboiler 108 (an amount of steam to be supplied) was increased to raise the carbon dioxide recovering ratio to 95%, the recovering energy became 4.0 GJ/t-$CO_2$. At this time, the amount of the condensate water in the gas-liquid separator 132 was 200 L per unit time.

Figure 5:
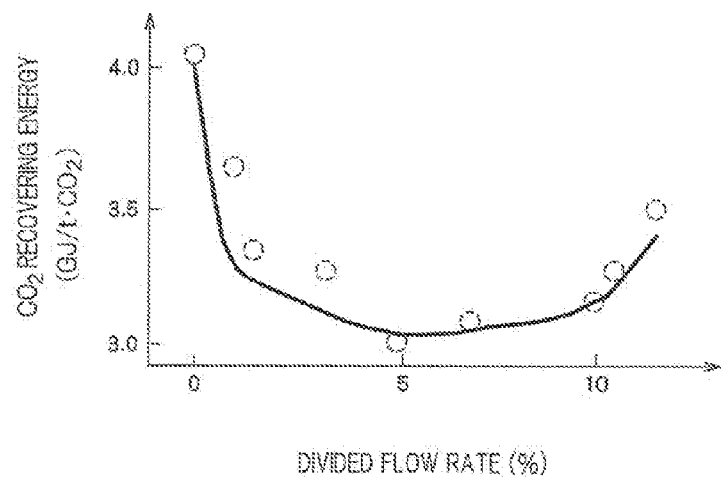
FIG. 5 is a graph illustrating relationship between the divided flow rate of the rich solution and the carbon dioxide recovering energy in Example 1.

Subsequently, while monitoring that a measurement result of the water gauge 401 provided in the gas-liquid separator 132 was being decreased, the flow distributor 107 was controlled by the controller 402 to raise the divided flow rate of the rich solution 303. FIG. 5 illustrates relationship between the divided flow rate of the rich solution 303 and carbon dioxide recovering energy. Also, FIG. 6 illustrates relationship between the divided flow rate of the rich solution 303 and the amount of the condensate water per unit time in the gas-liquid separator 132.

Figure 6:
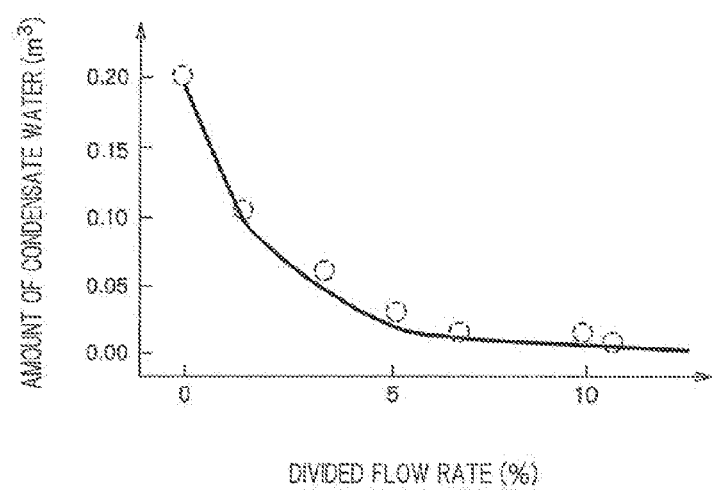
FIG. 6 is a graph illustrating relationship between the divided flow rate of the rich solution and the amount of the condensate water per unit time in the gas-liquid separator in Example 1.

As is apparent from FIG. 6, when the flow rate of the rich solution 303 exceeded 5% of the rich solution 301, the amount of the condensate water in the gas-liquid separator 132 was decreased to approximately 20 L per unit time and became almost constant. It was confirmed that, when the flow rate of the rich solution 303 was 5% of the rich solution 301, the carbon dioxide recovering ratio at the exit of the absorbing tower 101 was 90%, the carbon dioxide recovering energy was 3.1 GJ/t-$CO_2$, and the carbon dioxide recovering energy was able to be lowered further by 0.9 GJ/t-$CO_2$ than in a case of setting the entire amount of the rich solution 301 as the rich solution 302. It was confirmed that, by raising the divided flow rate of the rich solution 303 gradually from a predetermined value (zero, for example) until the amount of the condensate water became almost constant, the optimum divided flow rate was able to be obtained, heat recovery of the rich solutions from the lean solution and the carbon dioxide containing steam was able to be performed effectively, and carbon dioxide recovering energy was able to be restricted.

Example 2

In the carbon dioxide recovering apparatus illustrated in FIG. 1, the flue gas containing carbon dioxide 111 with 12% carbon dioxide with a flow rate of 100 Nm³/h was supplied to the absorbing tower 101 and was brought into countercurrent contact with an amine absorbing solution in the absorbing tower 101 to prepare the rich solution 301. First, the divided flow rate of the rich solution 303 was set to 30% of the rich solution 301, and the divided flow rate of the rich solution 302 was set to 70% of the rich solution 301. At this time, the carbon dioxide recovering ratio at the exit of the absorbing tower 101 was 70%, and the amount of the condensate water in the gas-liquid separator 132 was 10 L per unit time. Also, the carbon dioxide recovering energy became 3.8 GJ/t-$CO_2$.

Subsequently, when the flow distributor 107 was controlled by the controller 402 to lower the divided flow rate of the rich solution 303 to approximately 10% of the rich solution 301 while monitoring that a measurement result of the water gauge 401 provided in the gas-liquid separator 132 was not increased excessively (that the measurement result was almost constant), the carbon dioxide recovering ratio in the absorbing tower 101 was raised, and a 90% carbon dioxide recovering ratio was able to be achieved. The amount of the condensate water in the gas-liquid separator 132 at this time was 15 L per unit time and was almost constant. At this time, the carbon dioxide recovering energy was 3.0 GJ/t-$CO_2$, and it was confirmed that the carbon dioxide recovering energy was able to be lowered further by 0.8 GJ/t-$CO_2$ than in a case of setting the divided flow rate of the rich solution 303 to 30% of the rich solution 301.

Example 3

In the carbon dioxide recovering apparatus illustrated in FIG. 1, the flue gas containing carbon dioxide 111 with 12% carbon dioxide with a flow rate of 100 $Nm^3$/h was supplied to the absorbing tower 101 and was brought into countercurrent contact with an amine absorbing solution in the absorbing tower 101 to prepare the rich solution 301. First, the divided flow rate of the rich solution 303 was set to 30% of the rich solution 301, and the divided flow rate of the rich solution 302 was set to 70% of the rich solution 301. Example 3 differs from Example 2 only in that the heat input amount in the reboiler is approximately 5% smaller than that in Example 2. At this time, the carbon dioxide recovering ratio at the exit of the absorbing tower 101 was 65%, and the amount of the condensate water in the gas-liquid separator 132 was 15 L per unit time. Also, the carbon dioxide recovering energy became 3.9 GJ/t-$CO_2$.

Subsequently, when the flow distributor 107 was controlled by the controller 402 to lower the divided flow rate of the rich solution 303 to approximately 10% of the rich solution 301 while monitoring that a measurement result of the water gauge 401 provided in the gas-liquid separator 132 was not increased excessively (that the measurement result was almost constant), the carbon dioxide recovering ratio in the absorbing tower 101 was raised, and a 85% carbon dioxide recovering ratio was able to be achieved.

In addition, when the heat input amount in the reboiler 108 was increased, the carbon dioxide recovering ratio was raised to 90%. At this time, the carbon dioxide recovering energy was 3.0 GJ/t-$CO_2$, and it was confirmed that the carbon dioxide recovering energy was able to be lowered by 0.9 GJ/t-$CO_2$.

Example 4

In the carbon dioxide recovering apparatus illustrated in FIG. 4, the flue gas containing carbon dioxide 111 with 12% carbon dioxide with a flow rate of 100 $Nm^3$/h was supplied to the absorbing tower 101 and was brought into countercurrent contact with an amine absorbing solution in the absorbing tower 101 to prepare the rich solution 301.

First, the divided flow rate of the rich solution 303 was set to zero, and an entire amount of the rich solution 301 was set as the rich solution 302. At this time, a carbon dioxide recovering ratio at an exit of the absorbing tower 101 was 80%. When the heat input amount in the reboiler 108 (an amount of steam to be supplied) was increased to raise the carbon dioxide recovering ratio to 95%, the recovering energy became 4.0 GJ/t-$CO_2$. At this time, the amount of the condensate water in the gas-liquid separator 132 was 200 L per unit time.

Subsequently, while monitoring that a measurement result of the water gauge 401 provided in the gas-liquid separator 132 was being decreased, the flow distributor 107 was controlled by the controller 402 to raise the divided flow rate of the rich solution 303. When the flow rate of the rich solution 303 exceeded 5% of the rich solution 301, the amount of the condensate water in the gas-liquid separator 132 was decreased to approximately 20 L per unit time and became almost constant. It was confirmed that, when the flow rate of the rich solution 303 was 5% of the rich solution 301, the carbon dioxide recovering ratio at the exit of the absorbing tower 101 was 90%, the carbon dioxide recovering energy was 3.1 GJ/t-$CO_2$, and the carbon dioxide recovering energy was able to be lowered further by 0.9 GJ/t-$CO_2$ than in a case of setting the entire amount of the rich solution 301 as the rich solution 302. It was confirmed that, by raising the divided flow rate of the rich solution 303 gradually from zero until the amount of the condensate water became almost constant, the optimum divided flow rate was able to be obtained, heat recovery of the rich solutions from the lean solution and the carbon dioxide containing steam was able to be performed effectively, and carbon dioxide recovering energy was able to be restricted.

In at least one of the embodiments described above, heat recovery of the rich solutions from the lean solution and the carbon dioxide containing steam can be performed effectively, and carbon dioxide recovering energy can be restricted.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method for operating a carbon dioxide recovering apparatus, comprising:
introducing flue gas containing carbon dioxide into an absorbing tower, bringing the flue gas containing carbon dioxide into contact with an absorbing solution that absorbs carbon dioxide, and generating and discharging a first rich solution that has absorbed carbon dioxide;
dividing the first rich solution into a second rich solution and a third rich solution;
heating the second rich solution with use of a lean solution;
heating the third rich solution with use of carbon dioxide containing steam;
in a releasing tower, releasing and separating steam containing carbon dioxide from the heated second rich solution and third rich solution to generate the carbon dioxide containing steam and the lean solution;
with use of a gas-liquid separator, separating the carbon dioxide containing steam used to heat the third rich solution into carbon dioxide and condensate water;
measuring an amount of condensate water formed in the gas-liquid separator; and
controlling a flow dividing ratio between the second rich solution and the third rich solution such that the flow dividing ratio is initially set to a first value then subsequently set to a second value different from the first value, the second value being a value at which a further increase in the flow dividing ratio does not substantially change the measured amount of condensate water formed in the gas-liquid separator.

2. The method for operating a carbon dioxide recovering apparatus according to claim 1, wherein the first value is zero and a flow rate of the third rich solution is raised until the second value is 10% or less.

3. The method for operating a carbon dioxide recovering apparatus according to claim 2, wherein a heat input amount of a reboiler connected to the releasing tower is controlled after the flow dividing ratio is set to the second value so that a carbon dioxide recovering ratio in the absorbing tower becomes a predetermined value.

4. A method for operating a carbon dioxide recovery apparatus, comprising:
   introducing flue gas containing carbon dioxide into an absorbing tower in which the flue gas contacts an absorbing solution that absorbs carbon dioxide from the flue gas to form a first rich solution;
   discharging the first rich solution from the absorbing tower;
   dividing the first rich solution discharged from the absorbing into a second rich solution and a third rich solution at a first flow dividing ratio value at a first time;
   heating the second rich solution with a lean solution generated in a releasing tower;
   heating the third rich solution with steam generated in the releasing tower, the steam including carbon dioxide released from the second and third rich solution in the releasing tower;
   supplying heated second and third rich solutions to the releasing tower,
   in the releasing tower, generating the lean solution and the steam including carbon dioxide by releasing the carbon dioxide from the heated second and third rich solutions;
   separating, in a gas-liquid separator, the steam that was used in heating the third rich solution into carbon dioxide and condensate water;
   measuring an amount of condensate water formed in the gas-liquid separator; and
   dividing the first rich solution into the second rich solution and the third rich solution at a second flow dividing ratio value different from the first flow dividing ratio value at a second time later than the first time, wherein the measured amount of condensate water formed in the gas-liquid separator is substantially constant at the second flow dividing ratio value.

5. The method for operating a carbon dioxide recovery apparatus according to claim 4, wherein measuring the amount of condensate water formed in the gas-liquid separator is performed by determining a level of condensate water in the gas-liquid separator.

6. The method for operating a carbon dioxide recovery apparatus according to claim 4, wherein measuring the amount of condensate water formed in the gas-liquid separator is performed by determining a flow rate of condensate water from the gas-liquid separator.

7. The method for operating a carbon dioxide recovery apparatus according to claim 4, wherein the first flow dividing ratio value is zero.

8. The method for operating a carbon dioxide recovery apparatus according to claim 4, wherein the first flow dividing ratio value is greater than the second flow dividing ratio value.

9. The method for operating a carbon dioxide recovery apparatus according to claim 4, further comprising:
   adjusting a heat input amount supplied to a reboiler connected to the releasing tower while the dividing the first rich solution into the second rich solution and the third rich solution is performed at the second flow dividing ratio value, the heat input amount being set at a value to provide a predetermined carbon dioxide recovering ratio value.

10. The method for operating a carbon dioxide recovery apparatus according to claim 1, wherein the flow dividing ratio is gradually increased from the first value to the second value.

* * * * *